UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PLASTIC COMPOSITION AND METHOD OF MAKING THE SAME.

1,281,080.

Specification of Letters Patent.  Patented Oct. 8, 1918.

No Drawing.  Application filed February 7, 1918.  Serial No. 215,898.

*To all whom it may concern:*

Be it known that I, PAUL C. SEEL, a citizen of the United States of America, residing at Rochester, in the county of Monroe and State of New York, have invented certain new and useful Improvements in Plastic Composition and Methods of Making the Same, of which the following is a full, clear, and exact specification.

This invention relates to a new composition of matter and a method of making the same, in which cellulose ethers are combined or mixed with other substances so that the resulting product can be advantageously used in the plastic and analogous arts, such for instance as sheet or film manufacture and varnish manufacture.

One object of my invention is to produce a composition of matter of only very slight inflammability which is safe in use. Another object is to provide a composition which may be made into permanently transparent, strong and flexible sheets, films or molded articles, which possess the desired properties of a support for a sensitive photographic coating. Another object of my invention is to produce a composition of matter capable of easy manipulation in the plastic and film making or varnish making or allied arts; which will not injuriously re-act with the substances with which it is associated during manufacture, storage or use. Still another object of my invention is to provide a process for compounding such composition of matter. Further objects will hereinafter appear.

I have discovered that a composition of matter having the desirable qualities hereinabove enumerated can be obtained by mixing or compounding a cellulose ether of the type described in U. S. Patent No. 1,188,376, granted June 20, 1916 to Leon Lilienfeld, with chlorin substitution products of the carbocyclic compounds, such as chlorinated naphthalenes or anthracenes, which are only slightly volatile or non-volatile at ordinary temperatures. I also prefer to select those chlorinated substances which are non-inflammable. This compounding is best performed by mixing the cellulose ether and the chlorinated compounds with a solvent common to both, such as a mixture of chloroform and denatured alcohol.

The volatility of the chlorinated compound should be very slight, after its incorporation in my composition, so that the loss of the small quantity which might be volatilized under conditions prevailing during its use and during the desired life of the film will not make the latter unserviceable. As applied to these compounds the term "non-inflammable" means, of course, only substantial non-inflammability, the chlorinated bodies themselves not acting normally to propagate combustion therein but rather being flame resisting. They impart this quality to a very marked degree to the composition in which I incorporate them. And, since the inflammability of the cellulose ethers is also very small, being relatively much less than that of cellulose or cellulose nitrates, the resulting composition is of minimum inflammability and, therefore, greatly reduces any fire risk.

The following substances may be mentioned as two typical examples of the chlorinated carbocyclic compounds which I can employ in exercising my invention. One of them is an almost colorless oily liquid consisting principally of alpha monochloronaphthalene, but containing small amounts of more highly chlorinated derivatives. It boils between 240° C. and 290° C., the bulk passing over between 250° C. and 275° C. The other is a translucent waxy crystalline body consisting of a mixture of higher chlorinated naphthalenes, chiefly tetrachloronaphthalenes. It has a boiling range of 310° C. to 340° C. Both of them are practically non-inflammable, the waxy body being especially so.

In carrying out one illustration of my invention I incorporate in 300 to 400 parts of chloroform and 150 to 250 parts of denatured alcohol (ethyl alcohol denatured for instance with small amounts of methyl alcohol), 50 to 100 parts of cellulose ether and 10 to 20 parts of the oily chlorinated naphthalene substance mentioned hereinabove. The ingredients are mixed to form a homogeneous solution or flowable mass and may be filtered if desired. The cellulose ether is preferably, although, of course, not necessarily, an ethyl ether of the type which is insoluble in water but soluble in the organic solvents noted.

Another example of my invention comprises the step of incorporating in 200 to 300 parts of chloroform and 150 to 250 parts of denatured alcohol, 50 to 100 parts of cellulose ether and 10 to 20 parts of the waxy chlorinated naphthalene substance described hereinabove, the wax being first dissolved in twice its weight in amyl acetate before being added to the mixture. The ingredients are mixed thoroughly until a homogeneous solution or flowable mass results, which may be filtered if desired.

Both of these solutions are sufficiently thick and viscous to be properly flowed during sheet or film manufacture, the chloroform and denatured alcohol volatilizing, but not too rapidly to impair the product. The small amount of amyl acetate used in the second illustration is also volatile. The resulting films, containing the other unvolatilized ingredients, are so flexible, smooth, transparent and uniform that they may be used for any usual or preferred purpose. Due to their greatly reduced inflammability or, in other words, practical non-inflammability, they form an excellent "safety" motion picture film support. They are resistant to ordinary photographic chemicals and possess the other necessary attributes of a film base. The chlorinated compounds, having the halogen in the ring or closed chain, are so stable that they do not liberate the halogen nor injure metal or other parts with which they come in contact during manufacture, and, moreover, they do not chemically re-act with or injure the other bodies that they are associated with in the solution or film.

While I have hereinabove disclosed certain compositions and processes by way of example, my invention is not limited thereto nor to the proportions given therein, my experiments indicating that the proportions may vary widely from those given and equivalents may be substituted without departing from the principle of my invention as defined in the appended claims.

Having thus described my invention what I claim as new and desire to secure by Letters Patent is:

1. A composition of matter comprising cellulose ether and a chlorin substitution product of a carbocyclic compound.

2. A composition of matter comprising cellulose ether and a halogen substitution product of a carbocyclic compound having a halogen in the ring or closed chain.

3. A composition of matter comprising cellulose ether and a chlorin substitution product of naphthalene.

4. A composition of matter comprising alkyl cellulose ether and a chlorin substitution product of a carbocyclic compound.

5. A composition of matter comprising ethyl cellulose ether and a chlorin substitution product of a carbocyclic compound which is of only slight volatility and is practically non-inflammable.

6. A composition of matter comprising alkyl cellulose ether and a chlorin substitution product of naphthalene.

7. A composition of matter comprising cellulose ether, a chlorin substitution product of a carbocyclic compound and a solvent common to both.

8. A composition of matter comprising cellulose ether, a chlorin substitution product of a carbocyclic compound and a mixture of chloroform and alcohol.

9. A composition of matter comprising ethyl cellulose ether, a chlorin substitution product of a carbocyclic compound and a solvent common to both.

10. A composition of matter comprising ethyl cellulose ether, a chlorin substitution product of a carbocyclic compound and a mixture of chloroform and alcohol.

11. A composition of matter comprising ethyl cellulose ether, a chlorin substitution product of naphthalene and a volatile solvent common to both.

12. A composition of matter comprising ethyl cellulose ether 50 to 100 parts, chloroform 300 to 400 parts, denatured alcohol 150 to 250 parts and 10 to 20 parts of an oily chlorin substitution product of naphthalene containing an added amount of monochloronaphthalene and boiling between 242° C, and 290° C.

13. As an article of manufacture, a sheet of deposited or flowed cellulose ether containing a chlorin substitution product of a carbocyclic compound.

14. As an article of manufacture, a sheet of deposited or flowed ethyl cellulose ether containing a chlorin substitution product of naphthalene.

15. The process of making a composition of matter of very slight inflammability which comprises mixing cellulose ether and a chlorin substitution product of a carbocyclic compound in a common solvent.

16. The process of making a composition of matter of very slight inflammability which comprises mixing alkyl cellulose ether with a chlorin substitution product of a carbocyclic compound which is of only slight volatility and is practically non-inflammable in a volatile common solvent.

17. The process step which comprises mixing ethyl cellulose ether and a chlorin substitution product of naphthalene in chloroform and alcohol.

Signed at Rochester, New York, this 26th day of January, 1918.

PAUL C. SEEL.